United States Patent
Chastain et al.

(10) Patent No.: US 10,735,958 B2
(45) Date of Patent: *Aug. 4, 2020

(54) SYSTEM AND METHODS FOR UICC-BASED SECURE COMMUNICATION

(71) Applicant: AT&T Intellectual Property I, L.P., Atlanta, GA (US)

(72) Inventors: Walter Cooper Chastain, Atlanta, GA (US); Stephen Emille Chin, Marietta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/110,378

(22) Filed: Aug. 23, 2018

(65) Prior Publication Data

US 2018/0367996 A1     Dec. 20, 2018

Related U.S. Application Data

(63) Continuation of application No. 15/259,821, filed on Sep. 8, 2016, now Pat. No. 10,091,655, which is a
(Continued)

(51) Int. Cl.
*H04W 12/06* (2009.01)
*H04W 12/04* (2009.01)
(Continued)

(52) U.S. Cl.
CPC .......... *H04W 12/06* (2013.01); *G06F 21/305* (2013.01); *G06F 21/445* (2013.01); *G06F 21/72* (2013.01);
(Continued)

(58) Field of Classification Search
CPC ..... G06F 21/305; G06F 21/445; H04L 9/0861
(Continued)

(56) References Cited

U.S. PATENT DOCUMENTS 5,530,757 A   6/1996   Krawczyk
5,742,910 A   4/1998   Gallant et al.
(Continued)

FOREIGN PATENT DOCUMENTS

AU     2010315111 A1    6/2012
CA        2535102 C     5/2011
(Continued)

OTHER PUBLICATIONS

"SIMalliance LTE UICC Profile"—SIM Alliance, Jun. 23, 2013 https://simalliance.org/wp-content/uploads/2015/03/SIMalliance_LTE_UICC_Profile_V1.0.pdf (Year: 2013).*
(Continued)

*Primary Examiner* — Randy A Scott
(74) *Attorney, Agent, or Firm* — Guntin & Gust, PLC; Jay H. Anderson

(57) ABSTRACT

A system that incorporates the subject disclosure may include, for example, instructions which when executed cause a device processor to perform operations comprising sending a service request to a remote management server; receiving from the management server an authentication management function and an encryption key generator for execution by a secure element and an encryption engine for execution by a secure device processor, sending a request to establish a communication session with a remote device; and communicating with the remote device via a channel established using an application server. The secure element and the secure device processor authenticate each other using a mutual authentication keyset. The secure element, the secure device processor and the device processor each have a security level associated therewith; the security level associated with the secure device processor is intermediate between that of the secure element and that of the device processor. Other embodiments are disclosed.

20 Claims, 11 Drawing Sheets

Related U.S. Application Data continuation of application No. 14/688,015, filed on Apr. 16, 2015, now Pat. No. 9,461,993, which is a continuation of application No. 14/023,932, filed on Sep. 11, 2013, now Pat. No. 9,036,820.

(51) Int. Cl.

| | | |
|---|---|---|
| *H04L 29/06* | (2006.01) | |
| *G06F 21/30* | (2013.01) | |
| *G06F 21/44* | (2013.01) | |
| *G06F 21/72* | (2013.01) | |
| *G06F 21/77* | (2013.01) | |
| *H04L 9/08* | (2006.01) | |
| *H04L 9/32* | (2006.01) | |
| *H04W 4/70* | (2018.01) | |

(52) U.S. Cl.
CPC ............ *G06F 21/77* (2013.01); *H04L 9/0861* (2013.01); *H04L 9/0877* (2013.01); *H04L 9/3234* (2013.01); *H04L 9/3273* (2013.01); *H04L 63/0853* (2013.01); *H04L 63/0869* (2013.01); *H04W 12/04* (2013.01); *H04W 12/04031* (2019.01); *G06F 2221/2107* (2013.01); *G06F 2221/2113* (2013.01); *H04L 63/0428* (2013.01); *H04W 4/70* (2018.02)

(58) Field of Classification Search
USPC ........ 713/151, 164, 168, 169, 171; 726/2, 7, 726/8, 12
See application file for complete search history.

(56) References Cited

U.S. PATENT DOCUMENTS

| | | |
|---|---|---|
| 5,774,544 A | 6/1998 | Lee et al. |
| 6,005,942 A | 12/1999 | Chan et al. |
| 6,014,561 A | 1/2000 | Molne |
| 6,151,677 A | 11/2000 | Walter et al. |
| 6,615,038 B1 | 9/2003 | Moles et al. |
| 6,850,252 B1 | 2/2005 | Hoffberg |
| 6,892,301 B1 | 5/2005 | Hansmann et al. |
| 6,922,200 B1 | 7/2005 | Marques et al. |
| 7,165,173 B1 | 1/2007 | Herle |
| 7,171,460 B2 | 1/2007 | Kalavade et al. |
| 7,185,362 B2 | 2/2007 | Hawkes et al. |
| 7,239,704 B1 | 7/2007 | Maillard et al. |
| 7,257,844 B2 | 8/2007 | Woodward et al. |
| 7,269,732 B2 | 9/2007 | Kilian-Kehr |
| 7,346,586 B1 | 3/2008 | Walmsley et al. |
| 7,382,881 B2 | 6/2008 | Uusitalo et al. |
| 7,454,233 B2 | 11/2008 | Lu et al. |
| 7,472,123 B2 | 12/2008 | Hamatsu |
| 7,480,907 B1 | 1/2009 | Marolia et al. |
| 7,486,810 B1 | 2/2009 | Accapadi et al. |
| 7,499,960 B2 | 3/2009 | Dageville et al. |
| 7,606,560 B2 | 10/2009 | Labrou et al. |
| 7,668,315 B2 | 2/2010 | Quick, Jr. et al. |
| 7,715,823 B2 | 5/2010 | Bravo et al. |
| 7,751,567 B2 | 7/2010 | Quick, Jr. et al. |
| 7,882,208 B2 | 2/2011 | Akashika et al. |
| 7,917,751 B2 | 3/2011 | Keohane et al. |
| 7,933,591 B2 | 4/2011 | Blom et al. |
| 7,953,391 B2 | 5/2011 | Lee et al. |
| 8,027,472 B2 | 9/2011 | Aissi et al. |
| 8,032,756 B2 | 10/2011 | Inami |
| 8,037,522 B2 | 10/2011 | Holtmanns et al. |
| 8,055,910 B2 | 11/2011 | Kocher et al. |
| 8,064,598 B2 | 11/2011 | Vaha-Sipila et al. |
| 8,098,818 B2 | 1/2012 | Grilli et al. |
| 8,165,635 B2 | 4/2012 | Khan et al. |
| 8,166,524 B2 | 4/2012 | Sentinelli |
| 8,186,591 B2 | 5/2012 | Jolivet |
| 8,213,612 B2 | 7/2012 | Kaabouch et al. |
| 8,244,181 B2 | 8/2012 | Shuo |
| 8,260,259 B2 | 9/2012 | Semple et al. |
| 8,271,025 B2 | 9/2012 | Brisebois et al. |
| 8,307,410 B2 | 11/2012 | Martin et al. |
| 8,333,321 B2 | 12/2012 | Gressel et al. |
| 8,335,921 B2 | 12/2012 | von Behren et al. |
| 8,346,287 B2 | 1/2013 | King et al. |
| 8,380,171 B2 | 2/2013 | Link et al. |
| 8,387,119 B2 | 2/2013 | Patel et al. |
| 8,391,837 B2 | 3/2013 | Corda |
| 8,406,758 B2 | 3/2013 | Tagg et al. |
| 8,417,952 B2 | 4/2013 | Cheng et al. |
| 8,429,708 B1 | 4/2013 | Tandon |
| 8,452,012 B2 | 5/2013 | Aissi et al. |
| 8,483,261 B2 | 7/2013 | Seo et al. |
| 8,494,908 B2 | 7/2013 | Herwig et al. |
| 8,495,213 B2 | 7/2013 | Deprun et al. |
| 8,503,376 B2 | 8/2013 | Cha et al. |
| 8,505,085 B2 | 8/2013 | Logan et al. |
| 8,510,553 B2 | 8/2013 | Adrangi et al. |
| 8,510,559 B2 | 8/2013 | Guccione et al. |
| 8,533,803 B2 | 9/2013 | Cha et al. |
| 8,543,814 B2 | 9/2013 | Laitinen et al. |
| 8,554,222 B2 | 10/2013 | Yang et al. |
| 8,559,633 B2 * | 10/2013 | Yang .................... H04L 63/061 380/44 |
| 8,606,319 B2 | 12/2013 | Ali et al. |
| 8,625,800 B2 | 1/2014 | Jooste et al. |
| 8,738,898 B2 | 5/2014 | Herwono et al. |
| 8,756,427 B2 | 6/2014 | Shah et al. |
| 8,776,189 B2 | 7/2014 | Jain |
| 8,799,451 B2 | 8/2014 | Raleigh et al. |
| 8,799,932 B2 | 8/2014 | Prevost et al. |
| 8,814,051 B2 | 8/2014 | Millet et al. |
| 8,837,449 B2 | 9/2014 | Chen et al. |
| 9,106,628 B2 | 8/2015 | Kolesnikov et al. |
| 9,130,972 B2 | 9/2015 | Barkan et al. |
| 9,185,089 B2 | 11/2015 | Khan et al. |
| 9,301,145 B2 | 3/2016 | Merrien et al. |
| 9,442,833 B1 | 9/2016 | Johansson et al. |
| 9,521,126 B2 | 12/2016 | Boelter et al. |
| 9,668,128 B2 | 5/2017 | Palanigounder et al. |
| 2001/0029581 A1 | 10/2001 | Knauft et al. |
| 2002/0003892 A1 | 1/2002 | Iwanaga et al. |
| 2002/0040936 A1 | 4/2002 | Wentker et al. |
| 2002/0174071 A1 | 11/2002 | Boudou et al. |
| 2002/0188855 A1 | 12/2002 | Nakayama et al. |
| 2003/0129965 A1 | 7/2003 | Siegel |
| 2003/0186722 A1 | 10/2003 | Weiner |
| 2004/0240671 A1 | 12/2004 | Hu et al. |
| 2005/0002407 A1 | 1/2005 | Shaheen et al. |
| 2005/0083947 A1 | 4/2005 | Vaarala et al. |
| 2005/0120248 A1 | 6/2005 | Medvinsky |
| 2005/0202803 A1 | 9/2005 | Mahalal |
| 2005/0259673 A1 | 11/2005 | Lu et al. |
| 2005/0278787 A1 | 12/2005 | Naslund et al. |
| 2006/0074550 A1 | 4/2006 | Freer et al. |
| 2006/0079284 A1 | 4/2006 | Lu et al. |
| 2006/0085848 A1 | 4/2006 | Aissi et al. |
| 2006/0101270 A1 | 5/2006 | Laitinen |
| 2006/0130128 A1 | 6/2006 | Gorancic et al. |
| 2006/0165060 A1 | 7/2006 | Dua |
| 2006/0205387 A1 | 9/2006 | Laitinen et al. |
| 2006/0206710 A1 | 9/2006 | Gehrmann |
| 2006/0242064 A1 | 10/2006 | Jogand-Coulomb et al. |
| 2006/0269061 A1 | 11/2006 | Balasubramanian et al. |
| 2006/0289659 A1 | 12/2006 | Mizushima et al. |
| 2007/0050365 A1 | 3/2007 | Laitinen et al. |
| 2007/0101122 A1 | 5/2007 | Guo |
| 2007/0239857 A1 | 10/2007 | Mahalal et al. |
| 2007/0294744 A1 | 12/2007 | Alessio et al. |
| 2007/0299780 A1 | 12/2007 | Vanska et al. |
| 2008/0005559 A1 | 1/2008 | Johnson |
| 2008/0010470 A1 | 1/2008 | McKeon et al. |
| 2008/0016230 A1 | 1/2008 | Holtmanns et al. |
| 2008/0059804 A1 | 3/2008 | Shah et al. |
| 2008/0065777 A1 | 3/2008 | Sherkin et al. |
| 2008/0080399 A1 | 4/2008 | Wang et al. |
| 2008/0107058 A1 | 5/2008 | Yang et al. |

(56) References Cited

U.S. PATENT DOCUMENTS

| | | |
|---|---|---|
| 2008/0127345 A1 | 5/2008 | Holtmanns et al. |
| 2008/0155257 A1 | 6/2008 | Werner et al. |
| 2008/0194296 A1 | 8/2008 | Roundtree |
| 2008/0276090 A1 | 11/2008 | Merrien et al. |
| 2008/0294891 A1 | 11/2008 | Ram et al. |
| 2008/0301433 A1 | 12/2008 | Vito |
| 2008/0304458 A1 | 12/2008 | Aghvami et al. |
| 2009/0077643 A1 | 3/2009 | Schmidt et al. |
| 2009/0116642 A1 | 5/2009 | Yang |
| 2009/0119506 A1* | 5/2009 | Allen .................. H04L 9/08 713/156 |
| 2009/0163235 A1 | 6/2009 | Michaels et al. |
| 2009/0191846 A1 | 7/2009 | Shi |
| 2009/0191857 A1 | 7/2009 | Horn et al. |
| 2009/0220091 A1 | 9/2009 | Howard |
| 2009/0287922 A1* | 11/2009 | Herwono .............. H04L 9/0822 713/155 |
| 2009/0288012 A1 | 11/2009 | Hertel et al. |
| 2009/0291712 A1 | 11/2009 | Park et al. |
| 2009/0313472 A1 | 12/2009 | Guccione et al. |
| 2009/0327138 A1 | 12/2009 | Mardani et al. |
| 2010/0037230 A1 | 2/2010 | Potonniee et al. |
| 2010/0048169 A1 | 2/2010 | Yan et al. |
| 2010/0062808 A1 | 3/2010 | Cha et al. |
| 2010/0159878 A1 | 6/2010 | Kim et al. |
| 2010/0185874 A1 | 7/2010 | Robles et al. |
| 2010/0197350 A1 | 8/2010 | Jeung |
| 2010/0235906 A1 | 9/2010 | Berry |
| 2010/0255819 A1 | 10/2010 | Robles et al. |
| 2010/0281251 A1 | 11/2010 | Arauz Rosado |
| 2010/0287375 A1 | 11/2010 | Lee et al. |
| 2010/0299731 A1 | 11/2010 | Atkinson |
| 2010/0306531 A1 | 12/2010 | Nahari |
| 2010/0315346 A1 | 12/2010 | Lindroos et al. |
| 2011/0003580 A1 | 1/2011 | Belrose et al. |
| 2011/0007899 A1 | 1/2011 | Park et al. |
| 2011/0029779 A1 | 2/2011 | Sekiya et al. |
| 2011/0035584 A1 | 2/2011 | Meyerstein et al. |
| 2011/0087610 A1 | 4/2011 | Batada et al. |
| 2011/0093913 A1 | 4/2011 | Wohlert et al. |
| 2011/0158090 A1 | 6/2011 | Riley et al. |
| 2011/0191597 A1 | 8/2011 | Grall et al. |
| 2011/0208600 A1 | 8/2011 | Aharoni et al. |
| 2011/0211699 A1 | 9/2011 | Ma et al. |
| 2011/0265159 A1 | 10/2011 | Ronda et al. |
| 2011/0269423 A1 | 11/2011 | Schell et al. |
| 2011/0275364 A1 | 11/2011 | Austin et al. |
| 2011/0296182 A1 | 12/2011 | Jia et al. |
| 2011/0296494 A1* | 12/2011 | Muller ................ H04L 63/0853 726/3 |
| 2011/0302017 A1 | 12/2011 | Marti et al. |
| 2011/0302408 A1 | 12/2011 | McDermott et al. |
| 2011/0306318 A1 | 12/2011 | Rodgers et al. |
| 2012/0027209 A1 | 2/2012 | Aissi et al. |
| 2012/0028609 A1 | 2/2012 | Hruska |
| 2012/0036042 A1 | 2/2012 | Graylin et al. |
| 2012/0047237 A1 | 2/2012 | Arvidsson et al. |
| 2012/0047563 A1 | 2/2012 | Wheeler et al. |
| 2012/0066504 A1 | 3/2012 | Hird et al. |
| 2012/0072979 A1 | 3/2012 | Cha et al. |
| 2012/0096513 A1 | 4/2012 | Raleigh et al. |
| 2012/0102557 A1 | 4/2012 | Felton et al. |
| 2012/0108205 A1 | 5/2012 | Schell et al. |
| 2012/0108213 A1 | 5/2012 | Kasargod et al. |
| 2012/0130838 A1 | 5/2012 | Koh et al. |
| 2012/0142332 A1 | 6/2012 | Li |
| 2012/0144201 A1 | 6/2012 | Anantha et al. |
| 2012/0159105 A1 | 6/2012 | von Behren et al. |
| 2012/0159163 A1 | 6/2012 | von Behren et al. |
| 2012/0159602 A1* | 6/2012 | Haynes ............ H04W 12/04031 726/9 |
| 2012/0171992 A1 | 7/2012 | Cheong et al. |
| 2012/0172016 A1 | 7/2012 | Veneroso et al. |
| 2012/0172089 A1 | 7/2012 | Bae et al. |
| 2012/0185661 A1 | 7/2012 | Desai et al. |
| 2012/0187184 A1 | 7/2012 | Challa et al. |
| 2012/0190354 A1 | 7/2012 | Merrien et al. |
| 2012/0208597 A1 | 8/2012 | Billman |
| 2012/0226582 A1 | 9/2012 | Hammad |
| 2012/0231844 A1 | 9/2012 | Coppinger et al. |
| 2012/0233685 A1 | 9/2012 | Palanigounder et al. |
| 2012/0246476 A1 | 9/2012 | Zhuang et al. |
| 2012/0259849 A1 | 10/2012 | Deodhar et al. |
| 2012/0266220 A1 | 10/2012 | Brudnicki et al. |
| 2012/0284785 A1 | 11/2012 | Salkintzis et al. |
| 2012/0311563 A1 | 12/2012 | Lee et al. |
| 2012/0317261 A1 | 12/2012 | Ahmavaara et al. |
| 2012/0331292 A1 | 12/2012 | Haggerty et al. |
| 2013/0012168 A1 | 1/2013 | Rajadurai et al. |
| 2013/0023235 A1 | 1/2013 | Fan et al. |
| 2013/0024383 A1 | 1/2013 | Kannappan et al. |
| 2013/0041830 A1 | 2/2013 | Singh et al. |
| 2013/0061303 A1 | 3/2013 | Hart et al. |
| 2013/0067232 A1 | 3/2013 | Cheung et al. |
| 2013/0067552 A1 | 3/2013 | Hawkes et al. |
| 2013/0074163 A1 | 3/2013 | Murakami et al. |
| 2013/0111546 A1 | 5/2013 | Gargiulo et al. |
| 2013/0117824 A1 | 5/2013 | Naslund et al. |
| 2013/0139230 A1 | 5/2013 | Koh et al. |
| 2013/0145455 A1 | 6/2013 | Vijayshankar et al. |
| 2013/0152208 A1 | 6/2013 | King et al. |
| 2013/0166595 A1 | 6/2013 | Meketa et al. |
| 2013/0173759 A1 | 7/2013 | Herse et al. |
| 2013/0203465 A1 | 8/2013 | Ali et al. |
| 2013/0212660 A1 | 8/2013 | Neafsey et al. |
| 2013/0223623 A1 | 8/2013 | Jooste et al. |
| 2013/0262317 A1 | 10/2013 | Collinge et al. |
| 2013/0272714 A1 | 10/2013 | Ohkubo |
| 2013/0273889 A1 | 10/2013 | Lobmaier |
| 2013/0291071 A1 | 10/2013 | Blom et al. |
| 2013/0291084 A1 | 10/2013 | Amiel et al. |
| 2013/0305330 A1 | 11/2013 | Palanigounder |
| 2013/0329683 A1 | 12/2013 | Gachon et al. |
| 2013/0333015 A1 | 12/2013 | Reynolds et al. |
| 2013/0344857 A1 | 12/2013 | Berionne et al. |
| 2014/0013406 A1 | 1/2014 | Tremlet et al. |
| 2014/0018041 A1 | 1/2014 | Summerer et al. |
| 2014/0040633 A1 | 2/2014 | Leleu |
| 2014/0045462 A1 | 2/2014 | Warnez |
| 2014/0057680 A1 | 2/2014 | Proust et al. |
| 2014/0066019 A1 | 3/2014 | Waters et al. |
| 2014/0073375 A1 | 3/2014 | Li et al. |
| 2014/0101449 A1 | 4/2014 | Trujillo Gonzalez et al. |
| 2014/0189880 A1 | 7/2014 | Funk |
| 2014/0215589 A1 | 7/2014 | Dietrich et al. |
| 2014/0243022 A1 | 8/2014 | L'Heriteau et al. |
| 2014/0281498 A1 | 9/2014 | Bransom et al. |
| 2014/0317686 A1 | 10/2014 | Vetillard et al. |
| 2014/0324698 A1 | 10/2014 | Dolcino et al. |
| 2014/0337234 A1 | 11/2014 | Brewer et al. |
| 2014/0373117 A1 | 12/2014 | Le |
| 2014/0380056 A1 | 12/2014 | Buckley et al. |
| 2015/0017910 A1 | 1/2015 | Li |
| 2015/0106456 A1 | 4/2015 | van Hoek |
| 2015/0249658 A1 | 9/2015 | Lee et al. |
| 2016/0006762 A1 | 1/2016 | Dumoulin et al. |
| 2016/0182512 A1 | 6/2016 | Chastain et al. |
| 2016/0323111 A1 | 11/2016 | Chastain et al. |
| 2016/0323255 A1 | 11/2016 | Chastain et al. |
| 2016/0381555 A1 | 12/2016 | Chastain |
| 2017/0118185 A1 | 4/2017 | Chastain et al. |
| 2017/0180366 A1 | 6/2017 | Chastain et al. |
| 2017/0295158 A1 | 10/2017 | Chastain |
| 2018/0054448 A1 | 2/2018 | Chastain et al. |
| 2018/0145980 A1 | 5/2018 | Chastain et al. |
| 2018/0191715 A1 | 7/2018 | Chastain et al. |
| 2018/0234405 A1 | 8/2018 | Chastain |
| 2018/0279117 A1 | 9/2018 | Chastain et al. |
| 2019/0007388 A1 | 1/2019 | Chastain et al. |
| 2019/0014129 A1 | 1/2019 | Chastain et al. |

(56) References Cited

U.S. PATENT DOCUMENTS

| | | |
|---|---|---|
| 2019/0141038 A1 | 5/2019 | Chastain et al. |
| 2019/0312885 A1 | 10/2019 | Chastain et al. |

FOREIGN PATENT DOCUMENTS

| | | | |
|---|---|---|---|
| CA | 2823685 | A1 | 2/2012 |
| EP | 1377091 | B1 | 12/2005 |
| EP | 1257922 | B1 | 6/2006 |
| EP | 1865437 | A2 | 12/2007 |
| EP | 1480476 | B1 | 10/2008 |
| EP | 2041913 | A1 | 4/2009 |
| EP | 2074741 | A1 | 7/2009 |
| EP | 2113856 | A1 | 11/2009 |
| EP | 2210436 | A1 | 7/2010 |
| EP | 2223252 | A1 | 9/2010 |
| EP | 2461613 | A1 | 6/2012 |
| EP | 2641206 | A1 | 9/2013 |
| KR | 2013027097 | | 3/2013 |
| WO | 2002063517 | | 8/2002 |
| WO | 03046719 | A2 | 6/2003 |
| WO | 2003046719 | | 6/2003 |
| WO | 2007079636 | | 7/2007 |
| WO | 2008059353 | A1 | 5/2008 |
| WO | 2008149196 | A1 | 12/2008 |
| WO | 2009046400 | | 4/2009 |
| WO | 2009126647 | | 10/2009 |
| WO | 2010027765 | A2 | 3/2010 |
| WO | 2010051715 | | 5/2010 |
| WO | 2011115407 | | 9/2011 |
| WO | 2012065829 | A1 | 5/2012 |
| WO | 2012110880 | A1 | 8/2012 |
| WO | 2012151571 | A2 | 11/2012 |
| WO | 2013006116 | A2 | 1/2013 |
| WO | 2013036009 | | 3/2013 |
| WO | 2013098117 | A1 | 7/2013 |
| WO | 2013050296 | | 11/2013 |

OTHER PUBLICATIONS

"Mobile/NFC Security Fundamentals Secure Elements 101" Smart Card Alliance Webinar Mar. 28, 2013.
"The Standard for Managing Applications on Secure Chip Technology," Interactive web site http://www.globalplatform.org/ Disclosing standards for GlobalPlatform chips—see tabs on "Specifications" and "Compliance", 1 pg., 2014.
"Over-The-Air Platform Security Review", Mandiant Intelligent Information Security, 6 pgs., Aug. 17, 2010.
"The OTA Platform in the World of LTE", 14 pgs., Jan. 2011.
"Reprogrammable SI Ms: Technology, Evolution and Implications Final Report", CSMG (Year: 2012), Sep. 25, 2012.
"3rd Generation Partnership Project; Technical Specification Group Core Network and Terminals; Characteristics of the Universal Subscriber Identity Module (USIM) application", Release 11, 2012.
"3rd Generation Partnership Project; Technical Specification Group Core Network and Terminals; Remote APDU Structure for (U)SIM Toolkit applications", Release 10, 2012.
"3rd Generation Partnership Project; Technical Specification Group Core Network and Terminals; Secured packet structure for (Universal) Subscriber Identity Module (U)SIM Toolkit applications", Release 10, 2012.
"3rd Generation Partnership Project; Technical Specification Group Core Network and Terminals; UICC-terminal interface; Physical and logical characteristics", Release 10, 2011.
"3rd Generation Partnership Project; Technical Specification Group Core Network and Terminals; Universal Subscriber Identity Module (USIM) Application Toolkit (USAT)", Release 11, 2012.
"GlobalPlatform Card Confidential Card Content Management Card Specification v2.2—Amendment A", 2011.
"GlobalPlatform Card Contactless Services Card Specification v2.2—Amendment C", 2012.
"GlobalPlatform Card Remote Application Management over HTTP Card Specification v2.2—Amendment B", 2012.
"GlobalPlatform Card Security Upgrade for Card Content Management Card Specification v 2.2—Amendment E", 2011.
"GlobalPlatform Card Specification", Version 2.2.1, 2011.
"GlobalPlatform Card Technology Secure Channel Protocol 03 Card Specification v 2.2—Amendment D", 2009.
"GlobalPlatform Device Secure Element Remote Application Management", May 2011.
"GlobalPlatform Device Technology Secure Element Access Control", Version 1.0, May 2012.
"GlobalPlatform Device Technology TEE System Architecture", Dec. 2011.
"GlobalPlatform Key Management System", Functional Requirements, Nov. 2003.
"GlobalPlatform System Messaging Specification for Management of Mobile-NFC Services", Feb. 2011.
"Reprogrammable SIMs: Technology, Evolution and Implications", csmg, Sep. 25, 2012.
"Reprogrammable SIMs: Technology, Evolution and Implications Final Report", CSMG-Global, Sep. 25, 2012, 1-95.
"Secure Authentication for Mobile Internet Services", Sim Alliance, http://simalliance.org/wp-content/uploads/2015/03/12-01-01-WP_SIMallianceSecureAuthentication-EN-V1.1.pdf, Dec. 2011, 1-23.
"Smart Cards; Card Application Tookit (CAT)", Release 11, 2012.
"Smart Cards; ETSI numbering system for telecommunication application providers", Release 11, 2011.
"Smart Cards; Machine to Machine UICC; Physical and logical characteristics", Release 9, 2011.
"Smart Cards; Remote APDU structure for UICC based applications", Release 11, 2012.
"Smart Cards; Secure Channel Between a UICC and an End-Point Terminal (Release 7)", European Telecommunications Standards Institute, May 9, 2018, 5 pages.
"Smart Cards; Secured packet structure for UICC based applications", Release 11, 2012.
"Smart Cards; Security mechanisms for UICC based Applications—Functional requirements", Release 8, 2008.
"Smart Cards; UICC Application Programming Interface (UICC API) for Java Card™", Release 9, 2012.
"Smart Cards; UICC-Terminal Interface; Physical and logical characteristics", Release 10, 2011, 179 pages.
"Universal Mobile Telecommunications System (UMTS); UICC-terminal interface; Physical and logical characteristics", Release 10, 2011.
Barriga, et al., "M2M Remote-Subscription Management," Ericsson Review, ericsson.com, 6 pgs, 2011.
Bernabeu, "Liberty ID-WSF Advanced Client Implementation and Deployment guidelines for SIM/UICC Card environment," Liberty Alliance Project Version 1.0, 18 pgs., 2009.
Chen, "An efficient end-to-end security mechanism for IP multimedia subsystem", Computer Communications, 2008, vol. 31.18, pp. 4259-4268.
Chun-Ze, "Study and implementation of UICC security features," Journal of Chongqing University of Posts and Telecommunications (Natural Science Edition) 1 pg., 2006.
Dodson, Ben et al., "Snap2Pass: Consumer-Friendly Challenge-Response Authentication with a Phone", http://prpl.stanford.edu/papers/soups10j.pdf, Apr. 30, 2010.
Edlund, Lasse, "Secure and confidential application on UICC" KTH Computer Science and Communication Master of Science Thesis Stockholm, Sweden, 44 pgs., 2009.
Ericsson, "The OTA Platform in the World of LTE". Giesecke & Devrient, Jan. 2011.
Farhat, Farshid et al., "Private Identification, Authentication and Key Agreement Protocol with Security Mode Setup", Iran Telecommunication Research Center, https://eprint.iacr.org/2011/045.pdf, Apr. 2011, 21 pages.
Global Platform, "Secure Element Remote Application Management", Version 1.0, May 2011.
Huang, et al., "IC activation and user authentication for security-sensitive systems", IEEE 10.1109/HST.2008.4559056, 2008.

(56) References Cited

OTHER PUBLICATIONS

Imhontu, et al., "A survey on near field communication in mobile phones & PDAs", Dissertation Halmstad University, 2010. http://hh.diva-portal.org/smash/get/diva2:385433/FULLTEXT01.

Kim, Jong-Min et al., "A Study of Coupons issuance System Considering of User Convenience Based on NFC", 3rd International Conference on Computer Science and Information Technology (ICCSIT'2013) Jan. 4-5, 2013 Bali (Indonesia). http://psrcentre.org/images/extraimages/113118.pdf.

Kounelis, Ioannis et al., "Secure Middleware for Mobile Phones and UICC Applications", Mobile Wireless Middleware, Operating Systems, and Applications, Springer Berlin Heidelberg, 2012, 143-152.

Kounelis, Ioannis et al., "Security of service requests for cloud based m-commerce", MIPRO, 2012 Proceedings of the 35th International Convention, IEEE, 2012.

Lamotte, Thierry, "IP Smart Cards in the (Not So) Distant Future," ETSI Project Smart Card Platform Meeting Gemplus Research Lab Paper, 18 pgs., Mar. 15, 2001.

Leicher, "An Identity Provider using a Secure Element of a Phone: Smart Card Based OpenID," 14 pgs., 2012.

Lunde, Lars et al., "Using SIM for strong end-to-end Application Authentication," NTNU Innovation and Creativity, Master of Science in Communication Technology, 170 pgs., May 2006.

Meyerstein, et al., "Security Aspects of Smart Cards vs. Embedded Security in Machine-to-Machine (M2M) Advanced Mobile Network Applications", InterDigital Communications Corporation LLC, First International ICST Conference: MobiSec 2009, Security and Privacy in Mobile Information and Communication Systems, p. 214-225, Jun. 3-5, 2009.

Nagalakshmi, et al., "Modified Protocols for Internet Key Exchange (IKE) Using Public Encryption and Signature Keys", Information Technology: New Generations (ITNG), 2011 Eighth International Conference on, 2011, pp. 376, 381.

Nakarmi, Prajwol K., "Evaluation of VoIP Security for Mobile Devices," KTH Royal Institute of Technology, Master's Thesis, Stockholm, 82 pgs. Jun. 16, 2011.

Nelenkov, "Using the SIM card as a secure element in Android", http"//nelenkov.blogspot.com/2013/09/using-sim-card-as-secure-element.ntml, 11 pgs., 2013.

Sher, "Secure service provisioning (SSP) framework for IP multimedia subsystem (IMS)", Technical University of Berlin Doctoral thesis, 225 pgs., Dec. 14, 2007.

Siddiqi, "Smart Card Packaging Process Control System," KTH Royal Insitute of Technology School of Information and Communication Technology Stockholm, Sweden Masters Thesis, 102 pgs., Aug. 1, 2012.

Zhang, et al., "Cryptographic Key Agreement Protocol Simulation",. Semantics Knowledge and Grid (SKG), 2010 Sixth International Conference on, 2010, pp. 418, 419.

* cited by examiner

100

200

300

500

600

# SYSTEM AND METHODS FOR UICC-BASED SECURE COMMUNICATION

CROSS-REFERENCE TO RELATED APPLICATIONS

This application is a continuation of U.S. application Ser. No. 15/259,821, filed Sep. 8, 2016, which is a continuation of U.S. application Ser. No. 14/688,015, filed Apr. 16, 2015 (now U.S. Pat. No. 9,461,993), which is a continuation of U.S. application Ser. No. 14/023,932, filed Sep. 11, 2013 (now U.S. Pat. No. 9,036,820), which are incorporated herein by reference in their entirety.

FIELD OF THE DISCLOSURE

The subject disclosure relates to a system and method for secure communications between devices, based on a universal integrated circuit card (UICC) included in those devices.

BACKGROUND

Wireless communication devices such as cellular phones typically use one or more software applications to provide security-related functions. A device may include a universal integrated circuit card (UICC), which typically can securely store encryption keys and authentication credentials and can execute small applets. The device processor, on the other hand, can store and execute large and processor intensive applications, but is relatively unsecure.

BRIEF DESCRIPTION OF THE DRAWINGS

Reference will now be made to the accompanying drawings, which are not necessarily drawn to scale, and wherein.

DETAILED DESCRIPTION

Figure 1:
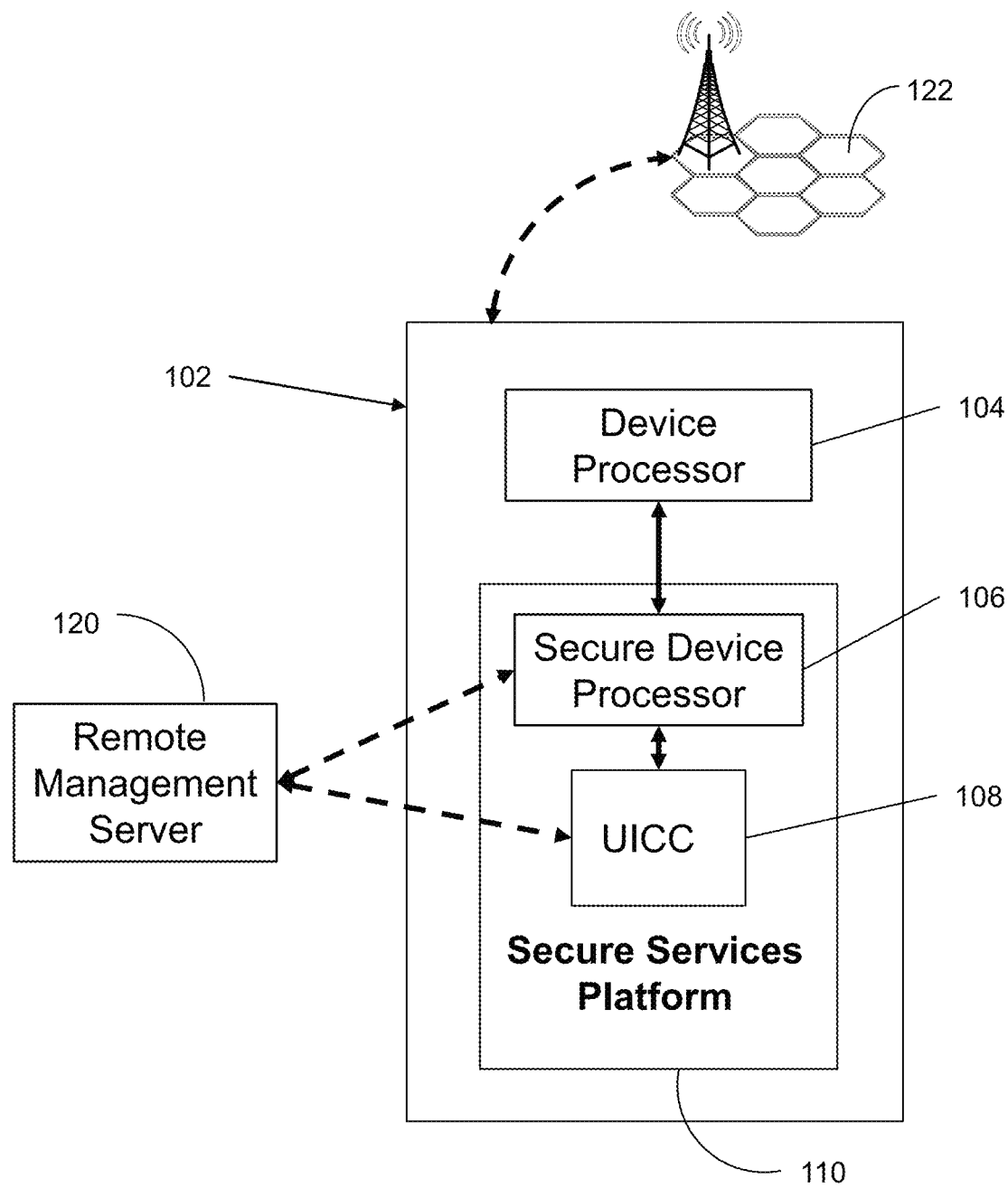
FIG. 1 depicts an illustrative embodiment of a communication device incorporating a secure services platform.

The subject disclosure describes, among other things, illustrative embodiments of a system and method for providing secure communication between devices. Other embodiments are included in the subject disclosure.

One embodiment of the subject disclosure includes a device comprising a secure element; a secure device processor separate from the secure element; a memory to store executable instructions; and a device processor separate from the secure device processor and coupled to the memory, the secure element and the secure device processor, wherein the device processor, responsive to executing the instructions, performs operations. The operations comprise sending a first request for service to a management server remote from the device; receiving from the management server an authentication management function and an encryption key generator for execution by the secure element and an encryption engine for execution by the secure device processor, to cause the secure element and the secure device processor to authenticate each other using a mutual authentication keyset; authenticating a user of the device using a user interface keyset, wherein user credentials are verified by the authentication management function; sending a second request for a secure signaling session to a secure application server remote from the device, wherein the second request is initiated by the secure device processor; receiving from the secure application server a first authentication signal, wherein the secure application server is authenticated by the authentication management function using a signaling authentication keyset; communicating with the secure application server via a first encrypted channel using a first signaling encryption keyset, wherein encryption and decryption of communications over the first encrypted channel is performed by the encryption engine and the first signaling encryption keyset is generated by the encryption key generator; sending a third request to the secure application server to establish a communication session with a second device; and receiving from the second device a second authentication signal. The second device is authenticated by the authentication management function using a bearer path authentication keyset. The mutual authentication keyset, the user interface keyset, the signaling authentication keyset, the first signaling encryption keyset, and the bearer path authentication keyset are distinct keysets.

One embodiment of the subject disclosure includes a method comprising sending, by a device comprising a device processor, a secure element and a secure device processor separate from the device processor, a first request for service to a management server remote from the device; receiving, by the device, from the management server an authentication management function and an encryption key generator for execution by the secure element and an encryption engine for execution by the secure device processor, to cause the secure element and the secure device processor to authenticate each other using a mutual authentication keyset, wherein the secure element and the secure device processor are separate from each other; sending, by the device, a second request for a secure signaling session to a secure application server remote from the device, wherein the second request is initiated by the secure device processor; receiving, by the device, from the secure application server a first authentication signal, wherein the secure application server is authenticated by the authentication management function using a signaling authentication keyset; communicating, by the device, with the secure application server via a first encrypted channel using a first signaling encryption keyset, wherein encryption and decryption of communications over the first encrypted channel is performed by the encryption engine and the first signaling encryption keyset is generated by the encryption key generator; sending, by the device, a third request to the secure application server to establish a communication session with a second device; and receiving, by the device, from the second device a second authentication signal, wherein the second device is authenticated by the authentication management function using a bearer path authentication keyset. The mutual authentication keyset, the signaling authentication keyset, the first signaling encryption keyset, and the bearer path authentication keyset are distinct keysets.

One embodiment of the subject disclosure includes a tangible computer-readable storage device comprising instructions, which when executed by a device processor cause the device processor to perform operations. The operations comprise sending a first request for service to a management server remote from the device; receiving from the management server an authentication management function and an encryption key generator for execution by a secure element and an encryption engine for execution by a secure device processor, to cause the secure element and the secure device processor to authenticate each other using a mutual authentication keyset, wherein the secure element and the secure device processor are separate from each other and coupled to the device processor; authenticating a user using a user interface keyset, wherein user credentials are verified by the authentication management function; sending a second request to establish a communication session with a remote second device, wherein the second request is initiated by the secure device processor; and communicating with the second device via a communication channel established using an application server. The secure element, the secure device processor and the device processor each have a security level associated therewith, and the security level associated with the secure device processor is intermediate between that of the secure element and that of the device processor. The secure element is a universal integrated circuit card, the secure element and the secure device processor form a secure service platform separate from the device processor, the mutual authentication keyset is provided to the secure service platform by the management server, and the management server transmits information to the secure service platform using a remote management keyset. The mutual authentication keyset, the user interface keyset and the remote management keyset are distinct keysets.

In accordance with an embodiment of the disclosure, FIG. 1 depicts an arrangement 100 of a communication device (CD) connected to a network and provided with a secure services platform enabling authentication of other communication devices and encrypted communication with those devices. It will be appreciated that the communication device may be any device, including a user device that has a secure element and a secure device processor and thus has secure communication capability. The term "user," in this embodiment, refers to a human user of the communication device. In other embodiments, the user can be a machine that exchanges data with the communication device after being authenticated to the communication device. Communication device 102 includes device processor 104, secure device processor 106 and a secure element 108. In this embodiment, secure element 108 is a universal integrated circuit card (UICC). The UICC is a secure computing platform and offers a high level of security for storing encryption keys, authentication credentials, and the like. The UICC may be removable from the device. Alternatively, the UICC may be embedded in the device and not removable. In other embodiments, the secure element can be placed on a memory card or an embedded chip. The secure device processor (SDP) 106 is logically and/or physically separate from the device processor 104, and is connected to both the device processor and the UICC. In this embodiment, the SDP offers a higher level of security than the device processor 104, and stores and executes secure applications. The SDP can, for example, run applications in a trusted execution environment. The secure element and secure device processor together form a secure services platform 110 resident on device 102. In this embodiment secure element 108, secure device processor 106 and device processor 104 each have a security level associated therewith, and the security level associated with the secure device processor 106 is intermediate between that of the secure element 108 and that of the device processor 104. The secure device processor and secure element use mutual authentication, as described in more detail below.

The secure element and secure device processor communicate with a management server 120, located remotely from device 102. The remote management server is a platform for provisioning and managing applications in the secure element and secure device processor. The remote management server also manages data (such as keys, credentials, etc.) that are used by the applications.

In this embodiment, user device 102 is a wireless communication device connected to a cellular network 122. Network 122 can also be a WiFi network. In other embodiments, device 102 can be connected to other devices via a wired connection through a computer. In still other embodiments, user devices may communicate with each other using Bluetooth, infrared communications (IRDa) or near field communications (NFC). A communication session between user devices, wherein information is transferred between the users, can be effected by a wide variety of arrangements. As explained in detail below, a secure application server (SAS) is used in some embodiments to establish a secure communication session between devices. However, a secure application server is not used in embodiments where the communication session is established in a peer-to-peer manner, such as in Bluetooth, IRDa or NFC.

Figure 2:
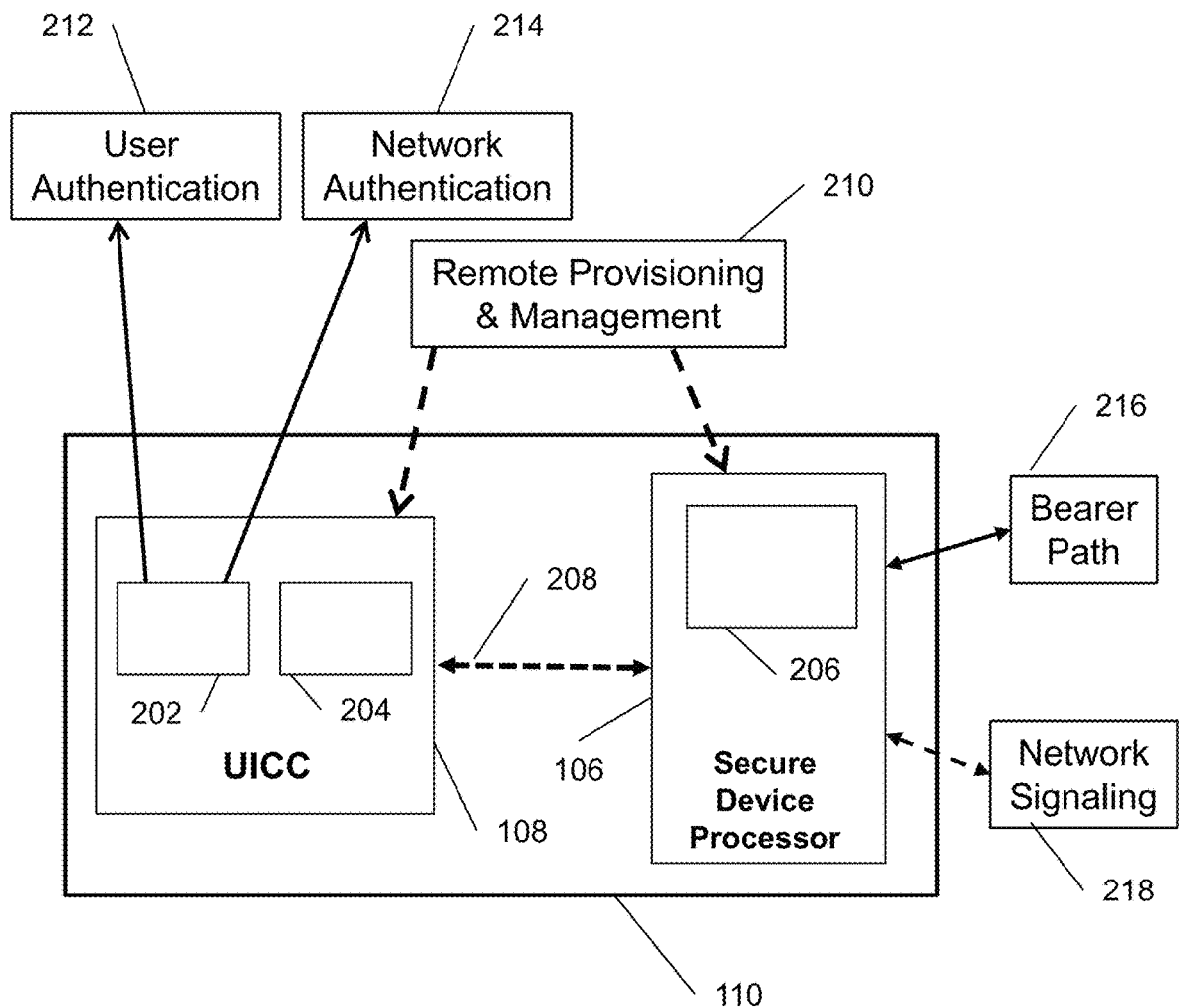
FIG. 2 depicts an illustrative embodiment of a secure services platform of a communication device.

FIG. 2 is a schematic illustration 200 showing details of a secure services platform 110, according to an embodiment of the disclosure. The secure element 108 (in this embodiment, a UICC) contains an authentication management function 202 and a real-time encryption key generator 204. The authentication management function 202 provides all authentication services for the device. Specifically, the authentication management function supports the mutual authentication of devices, supports the mutual authentication of the device with the SAS, and supports the mutual authentication of the device with the remote management server. As shown in FIG. 2, the authentication management function includes a user authentication service 212 for authenticating the user to the device and a network authentication service 214 for authenticating the device to network equipment. The real-time encryption key generator 204 supplies encryption keys to the real-time encryption engine 206 which is located in the SDP 106. The real-time encryption engine 206 encrypts and decrypts user information transmitted to or from a bearer path 216 that terminates at another user device, and may encrypt and decrypt information transmitted on a signaling path 218 to the network. In another embodiment, the encryption engine can be loaded on a second secure element, separate from the secure element 108.

The remote management server 120 performs a remote provisioning and management function 210 to load applications and content into the UICC and SDP. In this embodiment, the remote management server provisions the authentication management function 202 and real-time encryption key generator 204 on the UICC 108, and provisions the real-time encryption engine 206 on the SDP 106. This is done securely by the use of one or more remote management keysets. Before the secure services platform 110 can be used for communication, the SDP must be authenticated by the UICC. This is done using a UICC-SDP keyset. The UICC-SDP keyset may be provisioned remotely by the remote management server or locally by an authorized user. In this embodiment, after the UICC and SDP are mutually authenticated using the UICC-SDP keyset, they communicate via a signaling path 208 within the secure services platform 110. Alternatively, the path between the UICC 108 and the SDP 106 may go through the device processor 104 rather than directly between the UICC and the SDP.

Figure 3:
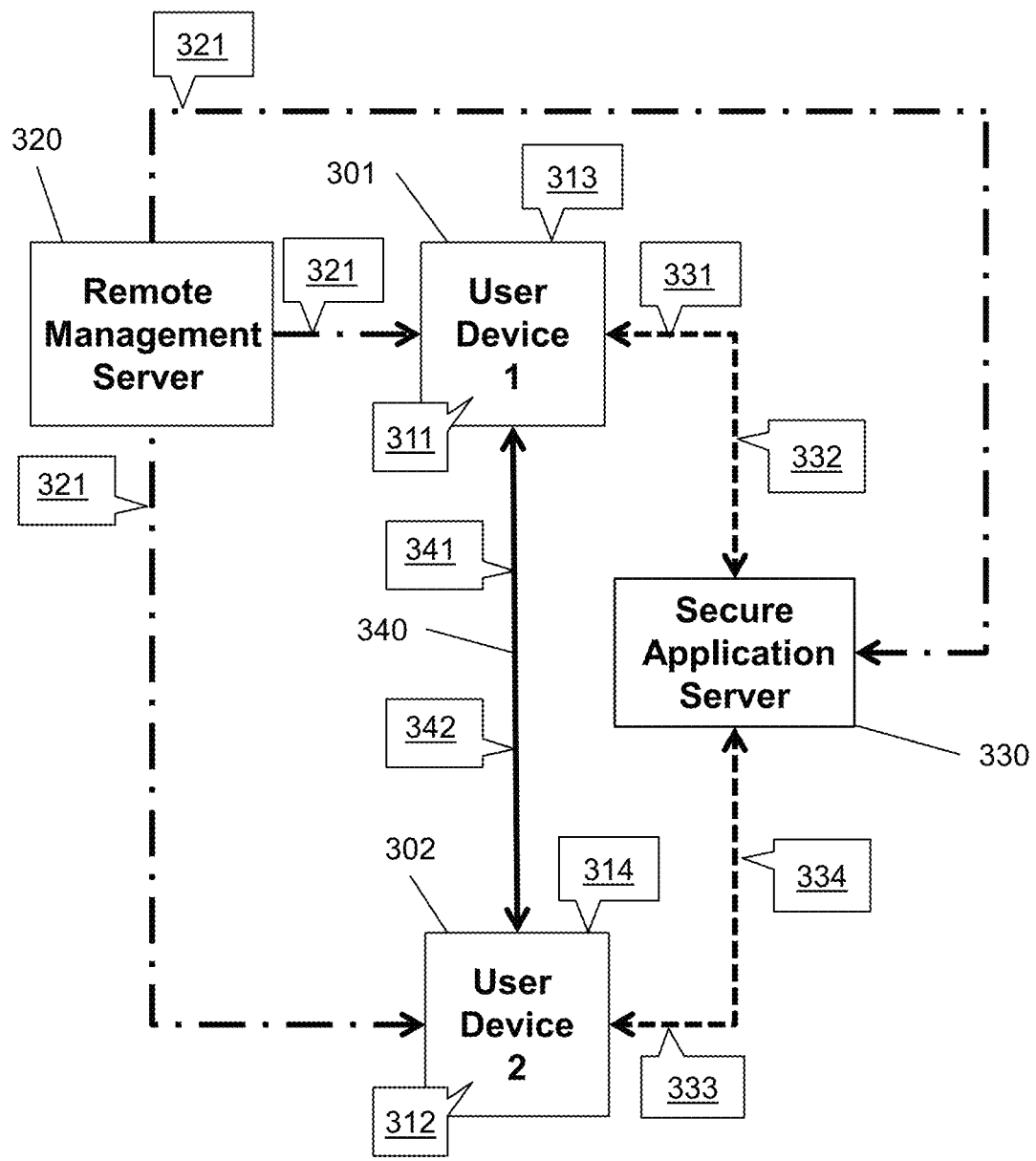
FIG. 3 schematically illustrates a network architecture for secure communication between user devices, according to an embodiment of the disclosure.

FIG. 3 schematically illustrates a network architecture 300 for facilitating secure communication between two user devices, according to an embodiment of the disclosure. In this embodiment, end-to-end security can be provided to end users by using the UICC and the SDP as a security platform in conjunction with a secure application server (SAS). A first user device 301 and a second user device 302 are each managed and provisioned by remote management server 320. Remote management keyset 321 is used to securely transmit information from the remote management server to the user devices. (In other embodiments, devices 301, 302 can be provisioned by separate remote management servers, generally using different keysets.) Each user device has a UICC and a SDP mutually authenticated by a UICC-SDP keyset, shown schematically at 311 and 312 respectively.

Each device must also have a user (or, in other embodiments, a machine that interacts with the device) authenticated to that device. User authentication is performed by the authentication management function of the UICC of each device, using a user interface keyset 313, 314 respectively. User authentication may involve many types of credentials: pin numbers, fingerprints, retinal scans, voice recognition, etc. The user interface keysets 313, 314 may be provisioned by the remote management server or locally by an authorized user.

In this embodiment, a secure application server 330 is used to establish a communication session between user devices 301, 302. The remote management server 320 provisions the secure application server 330 with user information related to the secure communication service. The secure application server and the UICC of user device 301 mutually authenticate each other using a signaling authentication keyset 331; the secure application server and the UICC of user device 302 mutually authenticate each other using a signaling authentication keyset 333. The secure application server can then establish secure signaling sessions with the user devices 301, 302, using signaling encryption keysets 332, 334 respectively. The authentication and encryption keysets are provisioned to the secure application server by the remote management server.

The secure application server 330 creates an unsecure communication session between user devices 301, 302 over a bearer path 340. The bearer path can include, but is not limited to, UMTS, LTE, and WiFi. Mutual authentication between the user devices is performed using a bearer path authentication keyset 341. If increased security is desired, the communication between devices can be encrypted using a bearer path encryption keyset 342.

Figure 4:
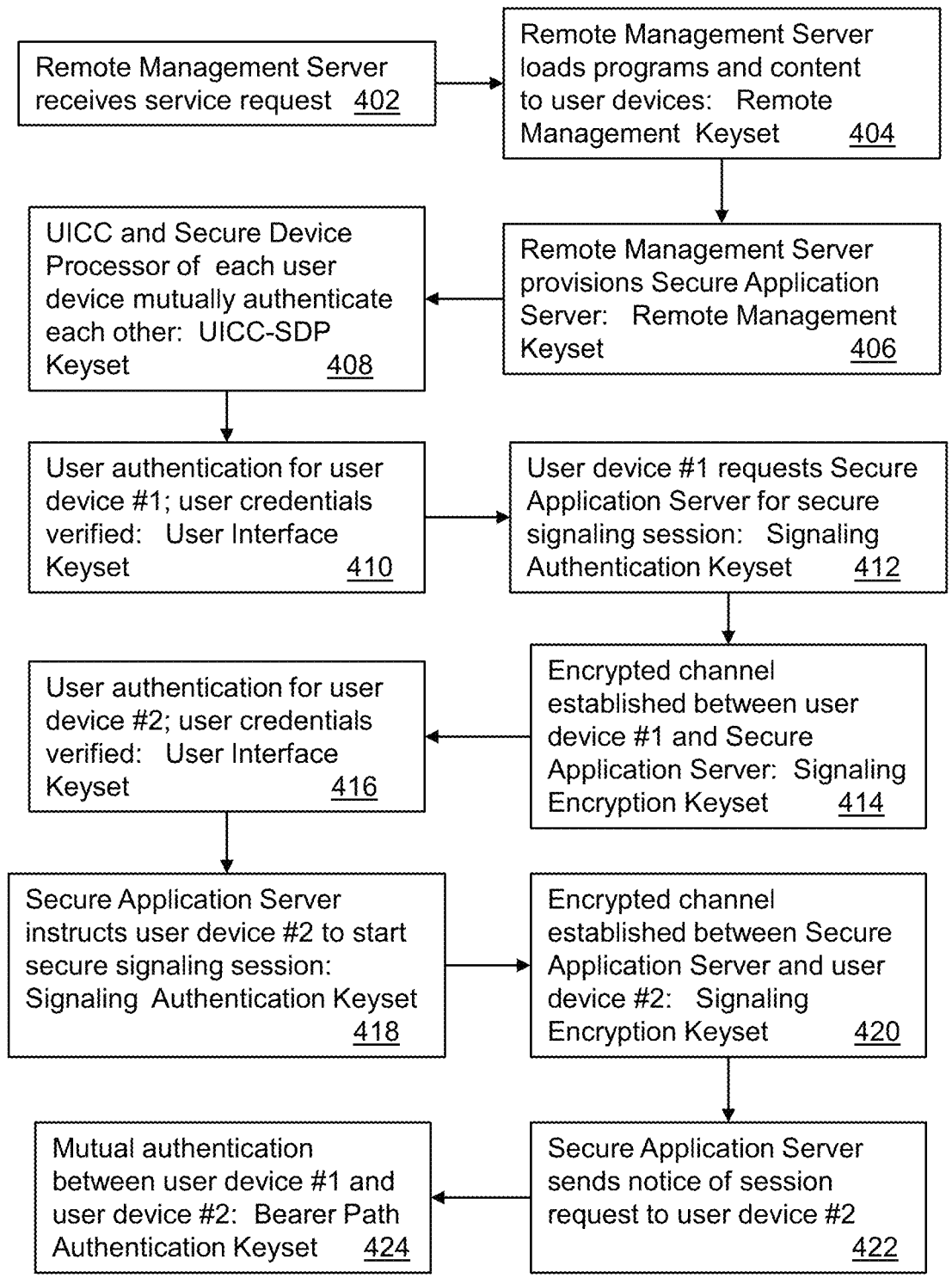
FIG. 4 depicts an illustrative embodiment of a method used in portions of the system described in FIG. 3, to establish a secure communication channel between user devices.

FIG. 4 is a flowchart 400 showing a procedure for establishing a communication session between two user devices using a secure application server, in accordance with an embodiment of the disclosure. Upon receiving a request for service (step 402), the remote management server 320 downloads programs and content to user devices 301, 302 to allow the user devices to support a secure communication service that includes real-time encryption and authentication services (step 404). For each of the user devices, the remote management server loads the real-time encryption engine into the secure device processor (SDP) of the device (e.g. smartphone, M2M device), the authentication management function to the secure element (e.g. a UICC), and the real-time encryption key generator to the secure element.

In step 406, the remote management server provisions the secure application server (SAS) 330 with information regarding the user devices 301, 302. Remote management keyset(s) 321 are used to securely transmit information from the remote management server to the user devices and to the secure application server 330. This process involves mutual authentication and encryption.

After the user devices are provisioned, the UICC and SDP within each device mutually authenticate each other (step 408). In this embodiment, this is done using UICC-SDP keysets 311, 312. In general, the UICC-SDP keysets used in the two user devices will be distinct keysets. The user of device 301 then authenticates with the device using user interface keyset 313 (step 410). User authentication may be performed using a variety of credentials, including pin number, fingerprint, retinal scan, etc. The user's credentials are verified by the authentication management function within the UICC of device 301. In this embodiment, wherein signaling to a secure application server is performed, the each of the users must authenticate with their device before establishment of a secure signaling channel to the SAS.

Secure application server 330 is used to set up a secure communication path between the two users through their respective devices (user device 301 and user device 302). The SDP of user device 301 initiates a request for a secure signaling session to the secure application server 330 (step 412). The secure application server 330 and the UICC of user device 301 mutually authenticate each other using a signaling authentication keyset 331. The secure application server 330 is authenticated by the authentication management function within the UICC of user device 301.

Once the user device 301 and the secure application server 330 are mutually authenticated, an encrypted channel is established between them using the signaling encryption keyset 332 (step 414). The encryption and decryption is performed by the real-time encryption engine in the SDP of user device 301. The signaling encryption keyset 332 is provided to the SDP by the real-time encryption key generator within the UICC of user device 301. The request for the session (originating from device 301 in step 412) is passed to the secure application server 330.

The user of device 302 must authenticate with the device before a signaling session can take place between device 302 and the secure application server 330. This is done (step 416) using user interface keyset 314, which may be different from user interface keyset 313. The user authentication process is performed by the authentication management function within the UICC of user device 302. The secure application server 330 then instructs user device 302 to establish a secure signaling session with the SAS (step 418). The secure application server 330 and the UICC of user device 302 mutually authenticate each other using signaling authentication keyset 333 (which may be different from signaling authentication keyset 331). The secure application server 330 is authenticated by the authentication management function within the UICC of user device 302.

Once mutually authenticated, an encrypted channel is established between user device 302 and the secure application server 330 (step 420), using signaling encryption keyset 334 (which may be different from signaling encryption keyset 332). The encryption and decryption is performed within the by the real-time encryption engine in the SDP of user device 302. The signaling encryption keyset 334 is provided to the SDP by the real-time encryption key generator within the UICC of user device 302. The request for the session (originating from device 301 in step 412) is passed from the secure application server 330 to user device 302.

In step 422, user device 302 is notified by the secure application server 330 that a session request has been made.

Mutual authentication is then performed directly between user device 301 and user device 302 using the bearer path authentication keyset 341 (step 424). This authentication process is performed by the authentication management functions within the UICC of user device 301 and user device 302.

Figure 5:
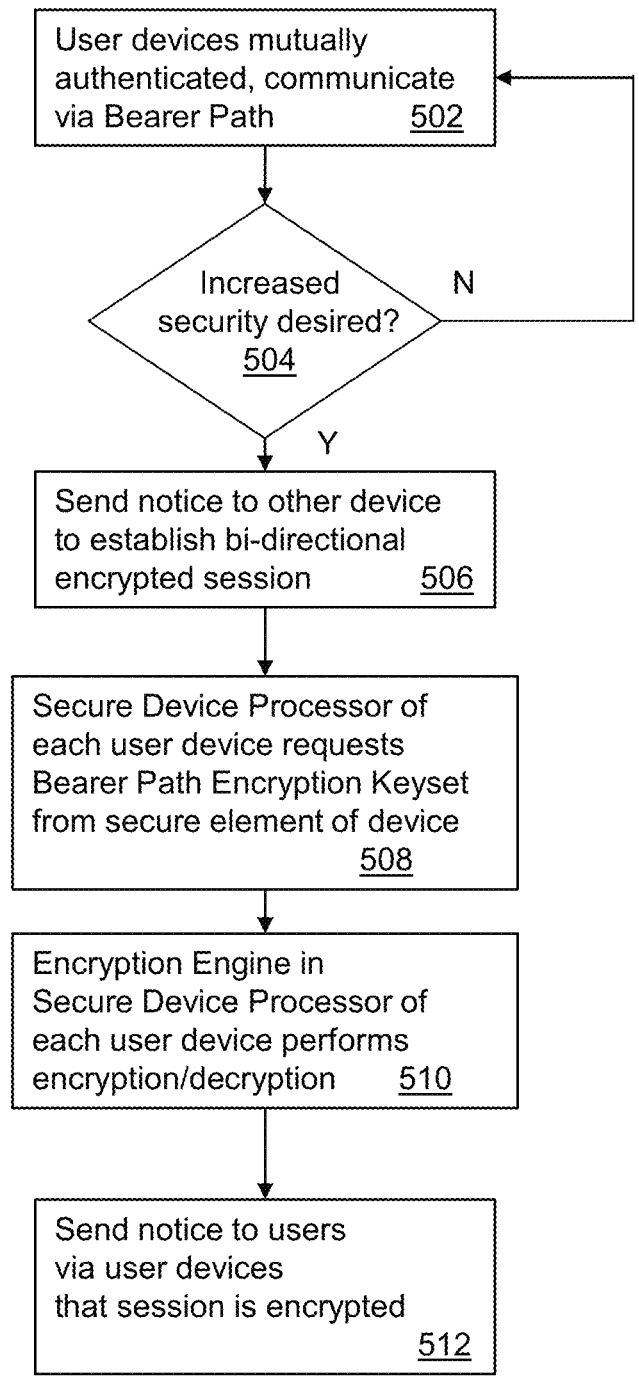
FIG. 5 depicts an illustrative embodiment of a method used in portions of the system described in FIG. 3, to establish an encrypted communication session between user devices.

FIG. 5 is a flowchart 500 showing a process, in accordance with an embodiment, to establish an encrypted communication session between user devices 301 and 302. This process is performed after the devices have mutually authenticated in accordance with a secure signaling session using SAS 330 and a bearer path 340 has been established, as described above with reference to FIG. 4.

User devices 301 and 302 communicate via bearer path 340 (step 502). If either user wishes to increase the security of the communication (step 504), that user's device sends a notice to the other device that a bi-directional encrypted session is desired (step 506). The SDP of each user device requests a bearer path encryption keyset from the real-time encryption key generator within the UICC of that device (step 508). The encryption and decryption is performed by the real-time encryption engine in each SDP (step 510). The devices 301, 302 then send notices to the respective users that each user is authenticated and that the communication session is encrypted (step 512).

Figure 6:
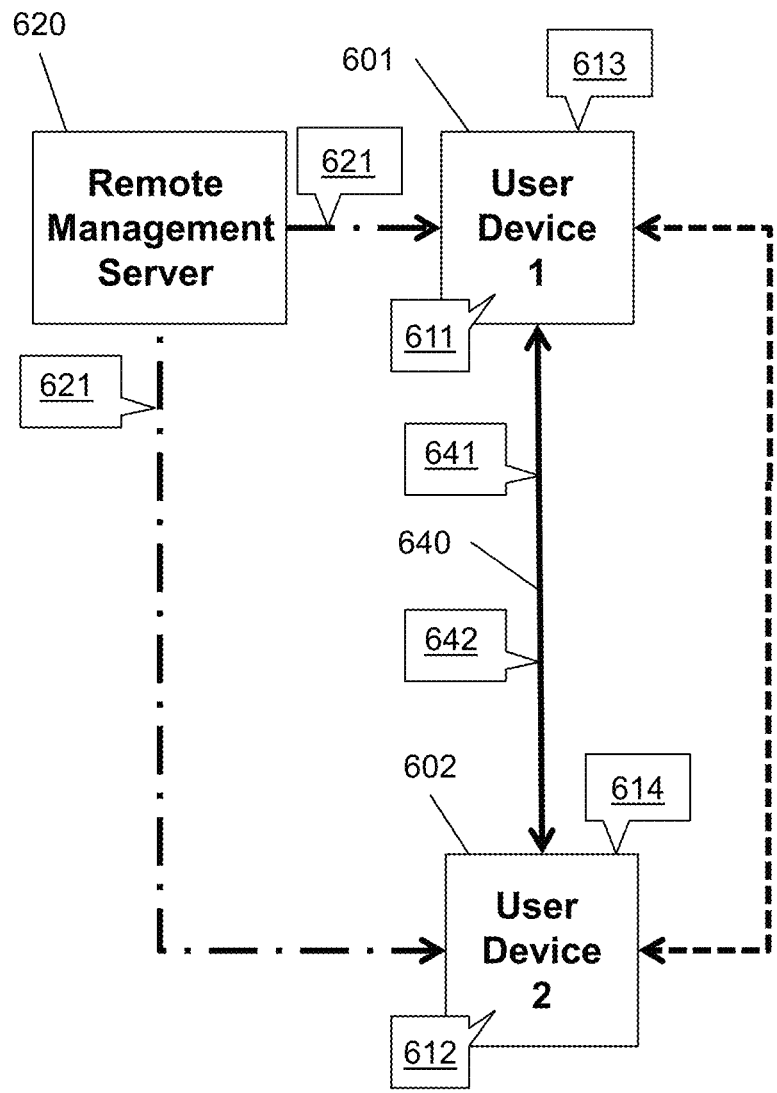
FIG. 6 schematically illustrates a network architecture for secure communication between user devices, according to another embodiment of the disclosure.

FIG. 6 schematically illustrates a network architecture 600 for facilitating secure communication between two user devices, according to another embodiment of the disclosure. In this embodiment, an application server is used to establish an unsecure communication channel; secure signaling between the devices and the application server is not performed. Authentication of the user devices to each other and encryption of the communication channel (bearer path) can be performed directly between the user devices.

The first user device 601 and the second user device 602 are each managed and provisioned by remote management server 620. Remote management keyset 621 is used to securely transmit information from the remote management server to the user devices. Each user device has a UICC and a SDP authenticated by a UICC-SDP keyset, shown schematically at 611 and 612 respectively.

Each device must also have a user authenticated to that device. (In other embodiments, the device can interact with a machine instead of a user.) User authentication is performed by the authentication management function of the UICC of each device, using a user interface keyset 613, 614 respectively. User authentication may involve many types of credentials: pin numbers, fingerprints, retinal scans, voice recognition, etc. The user interface keysets 613, 614 may be provisioned by the remote management server or locally by an authorized user.

An application server is used to establish an unsecure communication session over a bearer path 640 between the user devices 601, 602. (Alternatively, the unsecure communication session can be established directly between the devices, for example in a peer-to-peer arrangement.) The bearer path can include, but is not limited to, UMTS, LTE, and WiFi. If increased security is desired, mutual authentication between the user devices can be performed using a bearer path authentication keyset 641. The communication between devices 601, 602 can also be encrypted using a bearer path encryption keyset 642.

Figure 7:
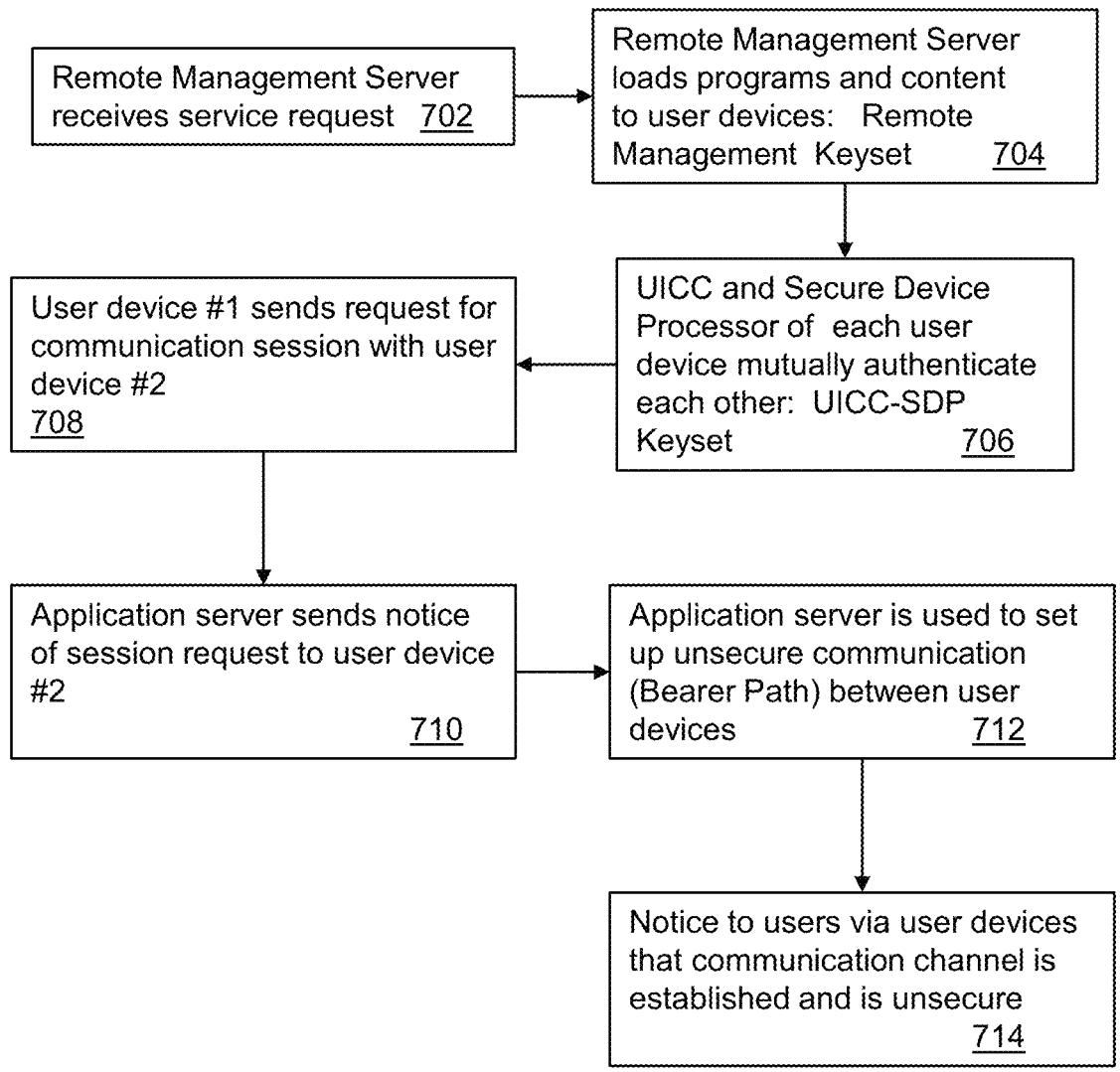
FIG. 7 depicts an illustrative embodiment of a method used in portions of the system described in FIG. 6, to establish a secure communication channel between user devices.

FIG. 7 is a flowchart 700 showing a procedure for establishing a communication session between two user devices, in accordance with the embodiment shown in FIG. 6. Upon receiving a request for service (step 702), the remote management server 620 downloads programs and content to user devices 601, 602 to allow the user devices to support a secure communication service that includes real-time encryption and authentication services (step 704). For each of the user devices, the remote management server loads the real-time encryption engine into the secure device processor (SDP) of the device (e.g. smartphone, M2M device), the authentication management function to the secure element (e.g., a UICC), and the real-time encryption key generator to the secure element. Remote management keyset(s) 621 are used to securely transmit information from the remote management server to the user devices. This process involves mutual authentication and encryption.

After the user devices are provisioned, the UICC and SDP within each device mutually authenticate each other (step 706). In this embodiment, this is done using UICC-SDP keysets 611, 612. In general, the UICC-SDP keysets used in the two user devices will be distinct keysets.

In this embodiment, an application server is used to set up an unsecure communication path between the two users through their respective devices (user device 601 and user device 602). The SDP of user device 601 begins the process of establishing communication with device 602 by directing a request for a communication session secure signaling session to the application server (step 708). It will be appreciated that in other embodiments, use of an application server is optional in setting up an unsecure communication path. For example, to establish a peer-to-peer communication session using Bluetooth or NFC, an application server would not be used.

In step 710, user device 602 is notified by the application server that a session request has been made.

An unsecure communication channel (bearer path 640) is established between user devices 601, 602 (step 712). The devices are not required to be authenticated to each other to establish the unsecure bearer path. Both users are notified that the communication channel has been established and is unsecure (step 716). In this embodiment, since the communication channel is unsecure, the users are not required to authenticate with their respective devices prior to the establishment of the bearer path.

Figure 8:
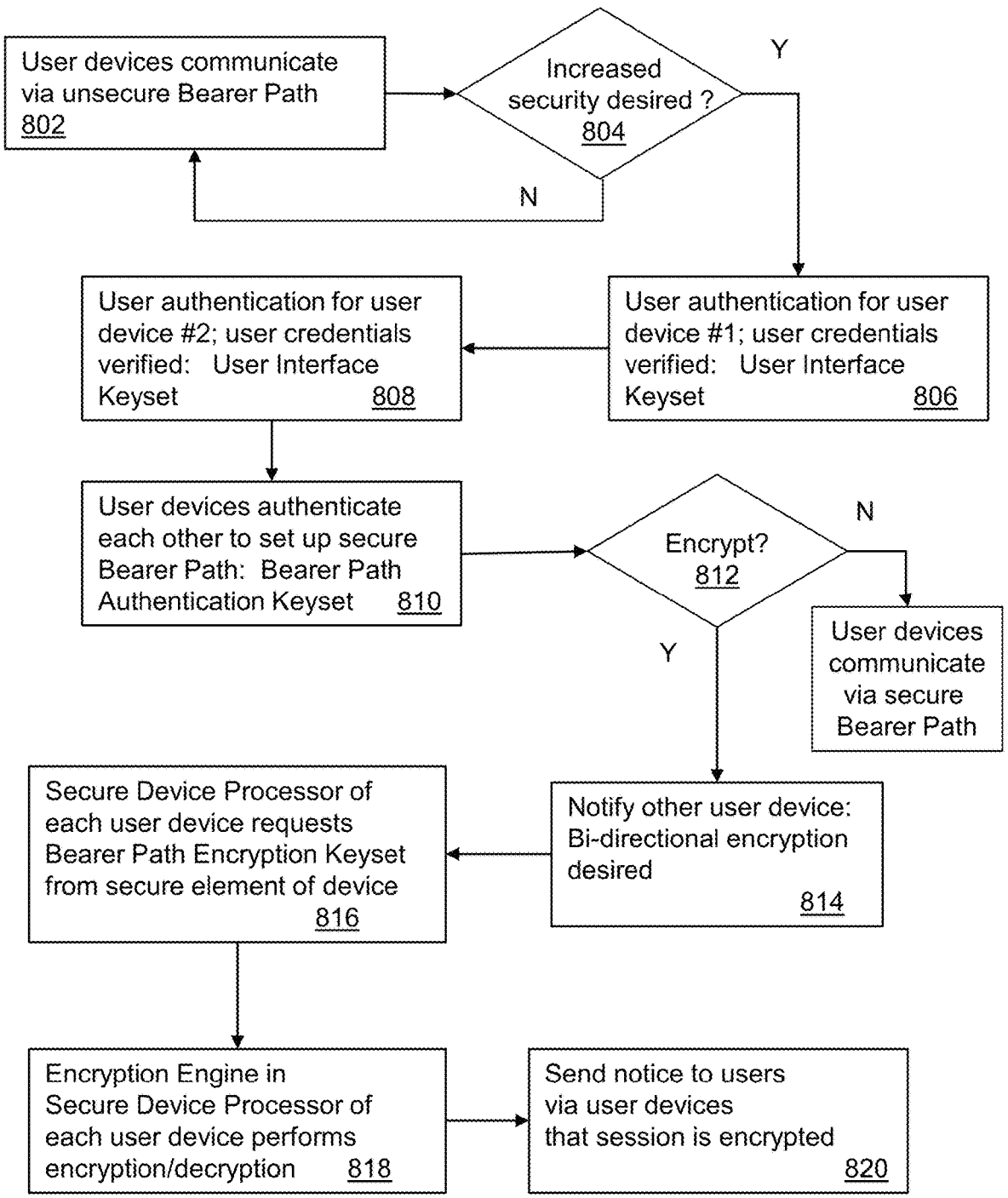
FIG. 8 depicts an illustrative embodiment of a method used in portions of the system described in FIG. 6, to establish an encrypted communication session between user devices.

FIG. 8 is a flowchart 800 showing a process, in accordance with an embodiment, to establish communication with increased security between user devices 601 and 602 after an unsecure bearer path has been established.

User devices 601 and 602 communicate via unsecure bearer path 640 (step 802). During the communication session, either user can determine (step 804) that the other user should be authenticated. Alternatively, this determination can be made by an automated process. If increased security is desired, the users authenticate with their respective devices (steps 806, 808), and the devices perform mutual authentication using bearer path authentication keyset 641 (step 810). The users must be authenticated with their respective devices prior to the mutual authentication of the devices to each other. This authentication process is performed by the authentication management functions within the secure element of the respective user devices. If the users were previously authenticated, they may be prompted to re-authenticate.

If encryption of the communication session is also desired (step 812), one user device (device 601 in this example) notifies the other that bi-directional encryption is to be performed (step 814). The SDP of each user device requests a bearer path encryption keyset from the real-time encryption key generator within the secure element of that device (step 816). The encryption and decryption is performed by the real-time encryption engine in each SDP (step 818). The devices 601, 602 then send notices to the respective users that each user is authenticated and that the communication session is encrypted (step 820).

Figure 9:
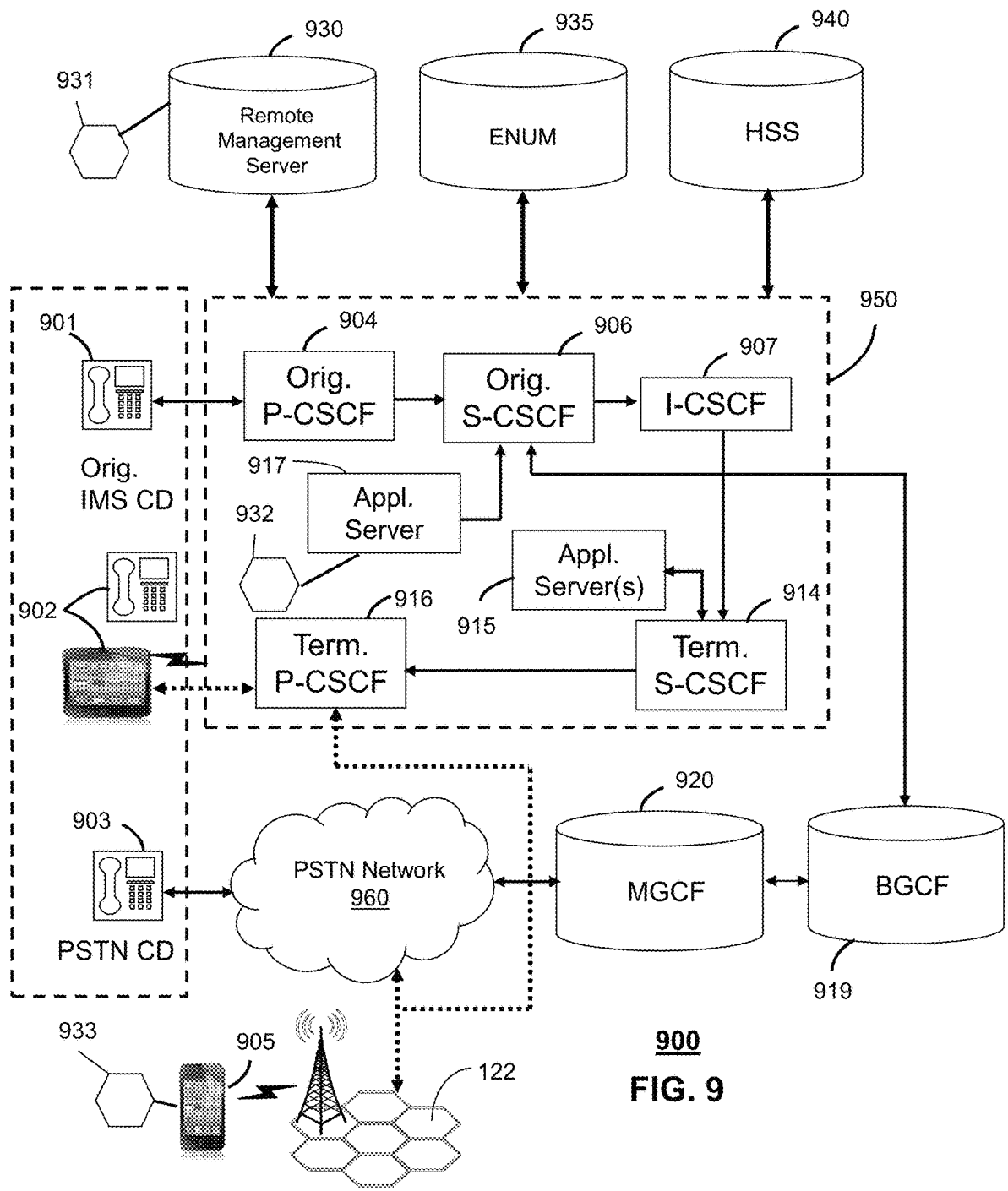
FIG. 9 depicts an illustrative embodiment of a communication system that provides media services to the user devices of FIG. 1.

FIG. 9 depicts an illustrative embodiment of a communication system 900 employing an IP Multimedia Subsystem (IMS) network architecture to facilitate the combined services of circuit-switched and packet-switched systems. Communication system 900 can be overlaid or operably coupled with the architecture of FIG. 3 or FIG. 6 as another representative embodiment of the disclosure. For example, any or all of the remote management server 320, the secure application server 330, user device 301 and user device 302 can be part of, or coupled to, the communication system. In particular, device 905 can comprise a secure element such as a UICC; a secure device processor (SDP) separate from the secure element; a memory to store executable instructions; and a device processor separate from the secure device processor (see FIG. 1), wherein in response to executing the instructions the device processor sends a first request for service to a management server and receives from the management server an authentication management function and an encryption key generator for execution by the secure element and an encryption engine for execution by the secure device processor, to cause the secure element and the secure device processor to mutually authenticate each other using a UICC-SDP keyset (see FIG. 2), and wherein the device authenticates a user of the device using a user interface keyset to verify user credentials by the authentication management function; sends a second request for a secure signaling session to a secure application server remote from the device, receives from the secure application server a first authentication signal, wherein the secure application server is authenticated by the authentication management function using a signaling authentication keyset; communicates with the secure application server via a first encrypted channel using a first signaling encryption keyset, wherein encryption and decryption of communications over the first encrypted channel is performed by the encryption engine and the first signaling encryption keyset is generated by the encryption key generator; and sends a third request to the secure application server to establish a communication session with a second device (see FIG. 3).

Communication system 900 can comprise a remote management server 930, located remotely from user communication device 905. In an embodiment, server 930 performs remote provisioning and management functions (shown schematically at 931) for user communication devices. User communication device 905 can perform an authentication management and real-time encryption key generation functions (shown schematically at 933). Communication system 900 can also comprise a Home Subscriber Server (HSS) 940, a tElephone NUmber Mapping (ENUM) server 935 and other network elements of an IMS network 950. The IMS network 950 can establish communications between IMS-compliant communication devices (CDs) 901, 902, Public Switched Telephone Network (PSTN) CD 903, and combinations thereof by way of a Media Gateway Control Function (MGCF) 920 coupled to a PSTN network 960. The MGCF 920 need not be used when a communication session involves IMS CD to IMS CD communications. A communication session involving at least one PSTN CD may utilize the MGCF 920.

IMS CDs 901, 902 can register with the IMS network 950 by contacting a Proxy Call Session Control Function (P-CSCF) which communicates with an interrogating CSCF (I-CSCF), which in turn, communicates with a Serving CSCF (S-CSCF) to register the CDs with the HSS 940. To initiate a communication session between CDs, an originating IMS CD 901 can submit a Session Initiation Protocol (SIP INVITE) message to an originating P-CSCF 904 which communicates with a corresponding originating S-CSCF 906. The originating S-CSCF 906 can submit the SIP INVITE message to one or more application servers (ASs) 917 that can provide a variety of services to IMS subscribers. An application server 917 can provide encryption and authentication functions (shown schematically at 932) for signaling messages between user devices and the application server. The IMS can support a secure application server as well as an application server.

For example, the application servers 917 can be used to perform originating call feature treatment functions on the calling party number received by the originating S-CSCF 906 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 906 can submit queries to the ENUM system 935 to translate an E.164 telephone number in the SIP INVITE message to a SIP Uniform Resource Identifier (URI) if the terminating communication device is IMS-compliant. The SIP URI can be used by an Interrogating CSCF (I-CSCF) 907 to submit a query to the HSS 940 to identify a terminating S-CSCF 914 associated with a terminating IMS CD such as reference 902. Once identified, the I-CSCF 907 can submit the SIP INVITE message to the terminating S-CSCF 914. The terminating S-CSCF 914 can then identify a terminating P-CSCF 916 associated with the terminating CD 902. The P-CSCF 916 may then signal the CD 902 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 9 may be interchangeable. It is further noted that communication system 900 can be adapted to support video conferencing. In addition, communication system 900 can be adapted to provide the IMS CDs 901, 902 with the multimedia and Internet services of communication system 400 of FIG. 4.

If the terminating communication device is instead a PSTN CD such as CD 903, the ENUM system 935 can respond with an unsuccessful address resolution which can cause the originating S-CSCF 906 to forward the call to the MGCF 920 via a Breakout Gateway Control Function (BGCF) 919. The MGCF 920 can then initiate the call to the terminating PSTN CD over the PSTN network 960 to enable the calling and called parties to engage in voice and/or data communications. However, a PSTN endpoint that does not have a secure element (such as a UICC) will not be able to establish a secure communication path as described herein.

It is further appreciated that the CDs of FIG. 9 can operate as wireline or wireless devices. For example, the CDs of FIG. 9 can be communicatively coupled to cellular base station 122, a femtocell, a WiFi router, a Digital Enhanced Cordless Telecommunications (DECT) base unit, or another suitable wireless access unit to establish communications with the IMS network 950 of FIG. 9. The cellular access base station 122 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 9.

Cellular phones supporting LTE can support packet-switched voice and packet-switched data communications and thus may operate as IMS-compliant mobile devices. In this embodiment, the cellular base station 122 may communicate directly with the IMS network 950 as shown by the arrow connecting the cellular base station 122 and the P-CSCF 916.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3rd Generation Partnership Project (3GPP). It is further noted that some or all embodiments of the subject disclosure may in whole or in part modify, supplement, or otherwise supersede final or proposed standards published and promulgated by 3GPP.

Figure 10:
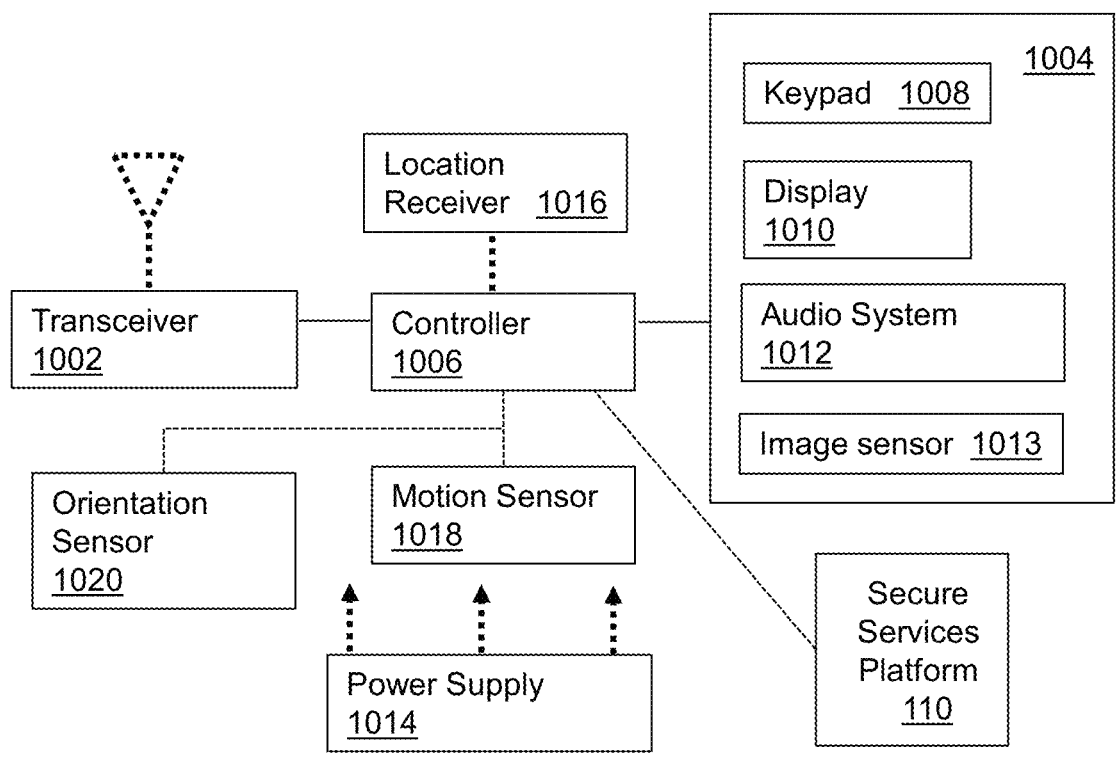
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIGS. 1 and 2. In particular, as shown in FIG. 10, the communication device can include a secure services platform that comprises a secure element such as a UICC; and a secure device processor (SDP) separate from the secure element (see FIG. 1), wherein the device can receive from a management server an authentication management function and an encryption key generator for execution by the secure element and an encryption engine for execution by the secure device processor, to cause the secure element and the secure device processor to mutually authenticate each other using a UICC-SDP keyset (see FIG. 2).

To enable these features, communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth, NFC, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth or NFC. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images, or sensors for fingerprints or other biometrics.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 400 can also include a slot for adding or removing a memory card or an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of the media processor 406, the media devices 408, or the portable communication devices 416 of FIG. 4, as well as the IMS CDs 901-902 and PSTN CD 903 of FIG. 9. It will be appreciated that the communication device 1000 can also represent other devices that can operate in communication systems 400-500 of FIGS. 4-5 such as a gaming console and a media player.

The communication device 1000 shown in FIG. 10 or portions thereof can serve as a representation of one or more of the devices of FIGS. 1 and/or 2, the user communication devices of FIGS. 3 and 6, and communication system 900. In addition, the controller 1006 can be adapted in various embodiments to perform the functions of device processor 104, coupled to secure services platform 110.

Upon reviewing the aforementioned embodiments, it would be evident to an artisan with ordinary skill in the art that said embodiments can be modified, reduced, or enhanced without departing from the scope of the claims described below.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
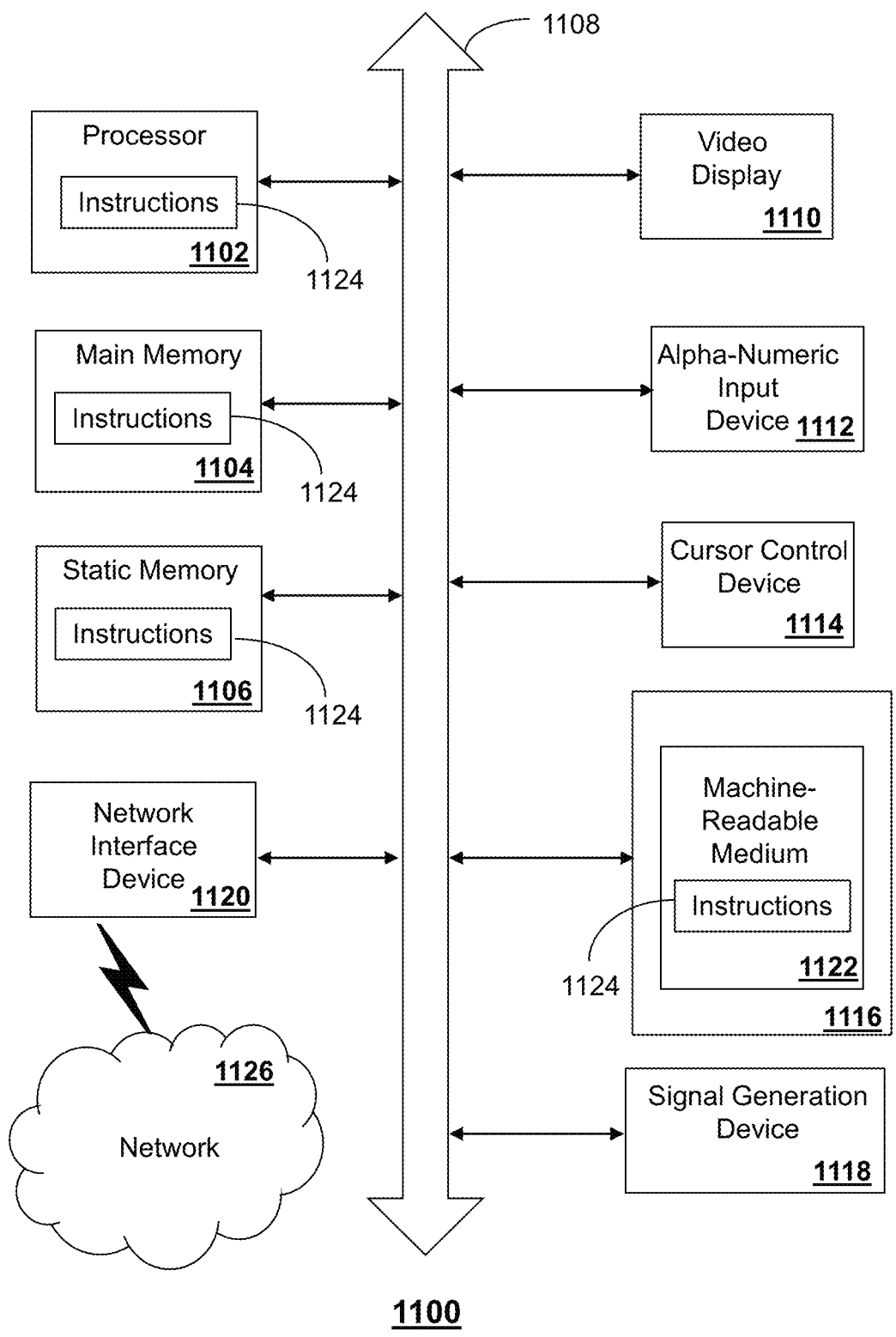
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the remote management server 320 or the secure application server 330, and other devices of FIGS. 1-3. In some embodiments, the machine may be connected (e.g., using a network 1126) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU), a graphics processing unit (GPU), or both), a main memory 1104 and a static memory 1106, which communicate with each other via a bus 11011. The computer system 1100 may further include a display unit 1110 (e.g., a liquid crystal display (LCD), a flat panel, or a solid state display. The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth, NFC, WiFi, ZigBee), and long-range communications (e.g., WiMAX, GSM, CDMA, LTE) can be used by computer system 1100.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
responsive to a first request that is received from a first wireless communication device over a wireless network, wirelessly providing, by a processing system including a processor, provisioning information to the first wireless communication device to be stored in a universal integrated circuit card (UICC) of the first wireless communication device, wherein the provisioning information includes authentication information that enables authentication of the first wireless communication device with the wireless network, and wherein the wirelessly providing of the provisioning information utilizes a secure transmission key to provide a secure transmitting of the provisioning information;
responsive to the wirelessly providing of the provisioning information, authenticating, by the processing system, the UICC of the first wireless communication device, according to an authentication key and by utilizing the authentication information, wherein the secure transmission key and the authentication key are distinct keys;
enabling, by the processing system, communication services for the first wireless communication device responsive to a successful authentication of the UICC of the first wireless communication device;
communicating by the processing system with a second wireless communication device via an encrypted channel, wherein the enabling communication services and the communicating with the second wireless communication device enables establishing, responsive to a second request by the first wireless communication device to establish a communication session between the first wireless communication device and the second wireless communication device, the communication session between the first wireless communication device and the second wireless communication device; and
provisioning, by the processing system using the secure transmission key, a secure application server with information regarding the first wireless communication device and the second wireless communication device, wherein the secure application server is authenticated by an authentication function on the UICC provisioned by the processing system.

2. The method of claim 1, further comprising provisioning, by the processing system, a key generator on the UICC.

3. The method of claim 2, further comprising provisioning, by the processing system, a user interface keyset on the UICC.

4. The method of claim 1, wherein the communicating with the second wireless communication system is performed using the secure transmission key.

5. The method of claim 3, wherein the authentication function performs an authentication procedure for a user of the first wireless communication device using the user interface keyset.

6. The method of claim 1, wherein the communication session between the first wireless communication device and the second wireless communication device is a bi-directional encrypted session.

7. The method of claim 1, further comprising provisioning, by the processing system, the secure application server with signaling authentication keysets to perform mutual authentication with the first wireless communication device and the second wireless communication device respectively.

8. The method of claim 1, wherein the UICC of the first wireless communication device comprises a first UICC, the second wireless communication device comprises a second UICC, the first wireless communication device and the second wireless communication device respectively further comprise a first secure device processor (SDP) and a second SDP, the first UICC and the first SDP are mutually authenticated using a first mutual authentication keyset, and the second UICC and the second SDP are mutually authenticated using a second mutual authentication keyset.

9. The method of claim 1, wherein the communication session between the first wireless communication device and the second wireless communication device is via a bearer path established by mutual authentication of the first wireless communication device and the second wireless communication device.

10. The method of claim 6, wherein the communication session is established consequent to a notice sent by either of the first wireless communication device or the second wireless communication device to the other of the first wireless communication device and the second wireless communication device.

11. A device comprising:
a processing system including a processor; and
a memory that stores executable instructions that, when executed by the processing system, facilitate performance of operations comprising:
wirelessly providing, responsive to a first request that is received from a first wireless communication device over a wireless network, provisioning information to the first wireless communication device to be stored in a universal integrated circuit card (UICC) of the first wireless communication device, wherein the provisioning information includes authentication information that enables authentication of the first wireless communication device with the wireless network, and wherein the wirelessly providing of the provisioning information utilizes a secure transmission key to provide a secure transmitting of the provisioning information;
authenticating, responsive to the wirelessly providing of the provisioning information, the UICC of the first wireless communication device according to an authentication key and by utilizing the authentication information;
enabling communication services for the first wireless communication device responsive to a successful authentication of the UICC of the first wireless communication device;
communicating with a second wireless communication device via an encrypted channel, wherein the enabling communication services and the communicating with the second wireless communication device enables establishing, responsive to a second request by the first wireless communication device to establish a communication session between the first wireless communication device and the second wireless communication device, the communication session between the first wireless communication device and the second wireless communication device;
provisioning an authentication function and a key generator on the UICC; and
provisioning a secure application server using the secure transmission key, wherein the secure application server is provided with information regarding the first wireless communication device and the second wireless communication device, wherein the secure application server is authenticated by the authentication function on the UICC.

12. The device of claim 11, wherein the operations further comprise provisioning a user interface keyset on the UICC.

13. The device of claim 12, wherein the authentication function performs an authentication procedure for a user of the first wireless communication device using the user interface keyset.

14. The device of claim 11, wherein the communication session between the first wireless communication device and the second wireless communication device is via a bearer path established by mutual authentication of the first wireless communication device and the second wireless communication device.

15. The device of claim 14, wherein the communication session is a bi-directional encrypted session established consequent to a notice sent by either of the first wireless communication device or the second wireless communication device to the other of the first wireless communication device and the second wireless communication device.

16. The device of claim 11, wherein the operations further comprise provisioning the secure application server with signaling authentication key sets to perform mutual authentication with the first wireless communication device and the second wireless communication device respectively.

17. A non-transitory machine-readable medium comprising executable instructions that, when executed by a processing system including a processor, facilitate performance of operations comprising:
wirelessly providing, responsive to a first request that is received from a first wireless communication device over a wireless network, provisioning information to the first wireless communication device to be stored in a universal integrated circuit card (UICC) of the first wireless communication device, wherein the provisioning information includes authentication information that enables authentication of the first wireless communication device with the wireless network, and wherein the wirelessly providing of the provisioning information utilizes a secure transmission key to provide a secure transmitting of the provisioning information;
authenticating, responsive to the wirelessly providing of the provisioning information, the UICC of the first wireless communication device according to an authentication key and by utilizing the authentication information;
enabling communication services for the first wireless communication device responsive to a successful authentication of the UICC of the first wireless communication device;
communicating with a second wireless communication device, wherein the enabling communication services and the communicating with the second wireless communication device enables establishing, responsive to a second request by the first wireless communication device to establish a communication session between the first wireless communication device and the second wireless communication device, the communication session between the first wireless communication device and the second wireless communication device; and
provisioning a secure application server with information regarding the first wireless communication device and the second wireless communication device, wherein the secure application server is authenticated by an authentication function on the UICC.

18. The non-transitory machine-readable medium of claim 17, wherein the communicating with the second wireless communication device is performed using the secure transmission key, and wherein the secure transmission key and the authentication key are distinct keys.

19. The non-transitory machine-readable medium of claim 17, wherein the operations further comprise:
provisioning a key generator on the UICC; and
provisioning a user interface keyset on the UICC, wherein the authentication function performs an authentication procedure for a user of the first wireless communication device using the user interface keyset.

20. The non-transitory machine-readable medium of claim 17, wherein the secure application server is provisioned using the secure transmission key.

* * * * *